United States Patent [19]

Nakagawa et al.

[11] Patent Number: 4,578,622

[45] Date of Patent: Mar. 25, 1986

[54] LINEAR PULSE MOTOR

[75] Inventors: Hiroshi Nakagawa; Zenichiro Miwa, both of Mie, Japan

[73] Assignee: Shinko Electric Co., Ltd., Tokyo, Japan

[21] Appl. No.: 543,927

[22] Filed: Oct. 20, 1983

[30] Foreign Application Priority Data

Oct. 26, 1982 [JP] Japan .................. 57-188843
Nov. 11, 1982 [JP] Japan .................. 57-198658

[51] Int. Cl.$^4$ ........................................... H02K 41/00
[52] U.S. Cl. ...................................... 318/135; 310/12
[58] Field of Search ................................ 310/12–14; 318/135

[56] References Cited

U.S. PATENT DOCUMENTS

| 3,716,731 | 2/1973 | Nilsson ..................... 310/13 |
| 3,829,746 | 8/1974 | Van ......................... 318/135 |
| 3,862,676 | 2/1975 | Chai et al. ................. 318/135 |
| 3,894,275 | 7/1975 | Baumans et al. ............. 318/135 |
| 4,286,180 | 8/1981 | Langley .................... 310/12 |
| 4,370,577 | 1/1983 | Wakabayashi et al. ......... 310/12 |

OTHER PUBLICATIONS

*IBM Tech. Disclosure Bulletin,* "Linear Incremental Motor", Thompson, vol. 6, No. 9, 2/64, pp. 19–20.

*Primary Examiner*—Donovan F. Duggan
*Attorney, Agent, or Firm*—McDougall, Hersh & Scott

[57] ABSTRACT

A linear pulse motor includes: a primary body including first magnetic circuit forming members provided with coils; a secondary body including a second magnetic circuit forming member, one of the primary body and the secondary body being movable relative to the other in one direction; the first magnetic circuit forming members including plural pole surfaces in each of which first plural teeth are formed at constant pitch, the groups of the first plural teeth of the plural pole surfaces being shifted from one another in a predetermined order by the pitch length x the reciprocal of the number of the pole surfaces (P/n, where P and n represent the pitch length of the first plural teeth and the number of the pole surfaces, respectively); the second magnetic circuit forming member including second plural teeth of the same pitch as the first plural teeth of the plural pole surfaces; and guide members for guiding the one of the primary body and the secondary body movably in the one direction, arranged between the primary body and the secondary body for maintaining the constant air gap between the first plural teeth and second plural teeth; wherein at least one closed magnetic circuit is formed by the first and second magnetic circuit members, and said air gap, and the first magnetic circuit forming members are so shaped and arranged relative to the second magnetic circuit forming member that, when the coils are energized in such a mode or order that magnetic attraction occurs between the selected one or ones of the groups of the first plural teeth in the predetermined order, and the second plural teeth of the secondary body for moving the one of the primary body and secondary body by P/n in the one direction, magnetic flux flowing through the first and second magnetic circuit forming members is substantially perpendicular to magnetic flux flowing through the air gap.

29 Claims, 11 Drawing Figures

LINEAR PULSE MOTOR

BACKGROUND OF THE INVENTION

1. Field of the Invention:

This invention relates to a linear pulse motor, and more particularly to a linear pulse motor which is suitable for small displacement of a moving body.

2. Description of the Prior Art:

A linear pulse motor is used, for example, for linearly moving and accurately positioning a head in a printer or an optical read-out apparatus. Necessary displacement and propelling force for the head are relatively small. Nevertheless, the small-sizing of the linear pulse motor is limited to some extent.

SUMMARY OF THE INVENTION

Accordingly, it is an object of this invention to provide a linear pulse motor which can be more small-sized than the prior art linear pulse motor.

Another object of this invention is to provide a linear pulse motor which is suitable for various terminal equipments.

In accordance with an aspect of this invention, a linear pulse motor comprises a primary body including first magnetic circuit forming means provided with a coil or coils; a secondary body including second magnetic circuit forming means, one of said primary body and said secondary body being movable relative to the other in one direction; said first magnetic circuit forming means including plural pole surfaces in each of which first plural teeth are formed at constant pitch, the groups of the first plural teeth of said plural pole surfaces being shifted from one another in a predetermined order by the pitch length X the reciprocal of the number of said pole surfaces (P/n, where P and n represent the pitch length of the first plural teeth and the number of said pole surfaces, respectively); said second magnetic circuit forming means including second plural teeth of the same pitch as said first plural teeth of the plural pole surfaces; and guide means for guiding said one of the primary body and the secondary body movably in said one direction, arranged between said primary body and said secondary body for maintaining the constant air gap between said first plural teeth and second plural teeth; wherein at least one closed magnetic circuit is formed by said first and second magnetic circuit means, and said air gap, and said first magnetic circuit forming means is so shaped and arranged relative to said second magnetic circuit forming means that, when said coil or coils are energized in such a mode or order that magnetic attraction occurs between the selected one or ones of the groups of said first plural teeth, in said predetermined order, and said second plural teeth of the secondary body for moving said one of the primary body and secondary body by P/n in said one direction, magnetic flux flowing through said first and second magnetic circuit forming means is substantially perpendicuar to magnetic flux flowing through said air gap.

The above, and other objects, features and advantages of the invention, will be apparent in the following detailed description of illustrative embodiments thereof which is to be read in connection with the accompanying drawings.

DETAILED DESCRIPTION OF PREFERRED EMBODIMENTS

Figure 1:
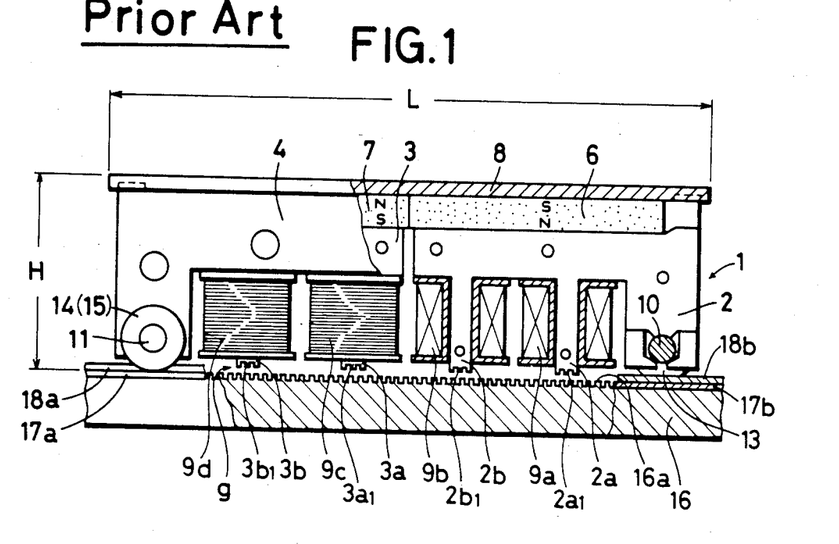
FIG. 1 is a partly-broken side view of a prior art linear pulse motor.
Figure 2:
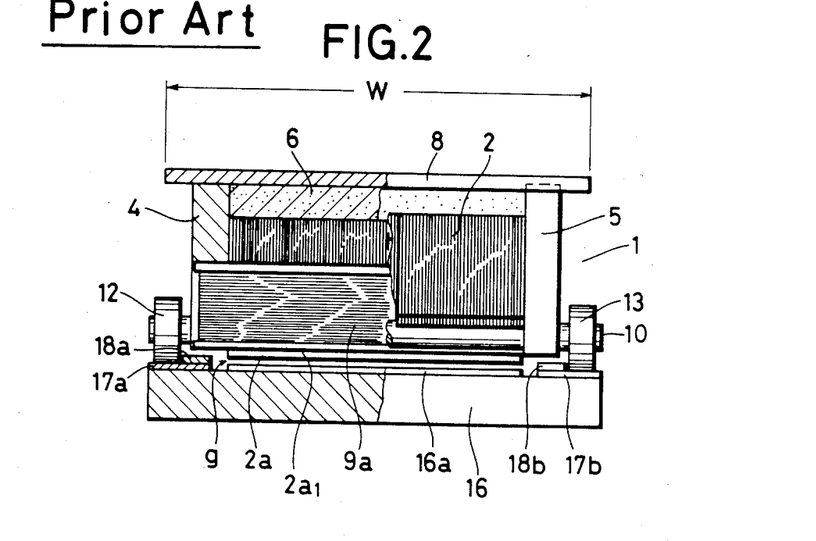
FIG. 2 is partly-broken front view of the prior art linear pulse motor.

First, for facilitating the understanding of this invention, a linear pulse motor of prior art will be described with reference to FIG. 1 and FIG. 2.

In a primary body 1, two iron cores 2 and 3 insulated magnetically from each other are fixed to non-magnetic side plates 4 and 5 at both sides. Permanent magnets 6 and 7 polarized oppositely to each other, as shown in FIG. 1, are attached to the upper surfaces of the iron cores 2 and 3, respectively. A magnetic plate 8 is mounted on the permanent magnets 6 and 7.

The iron cores 2 and 3 include downwardly extending magnetic poles $2a$ and $2b$, and $3a$ and $3b$, respectively. Coils $9a$, $9b$, $9c$ and $9d$ are fitted to the magnetic poles $2a$, $2b$, $3a$ and $3b$, respectively. Axles 10 and 11 of non-magnetic material are supported by the lower end portions of the side plates 4 and 5. Wheels 12 and 13, and 14 and 15 are rotatably supported on the end portions of the axles 10 and 11, respectively. Three teeth $2a1$, $2b1$, $3a1$ and $3b1$, are formed at regular pitches on the lower end surfaces of the magnetic poles $2a$, $2b$, $3a$ and $3b$, respectively. The pitches of the teeth $2a1$, $2b1$, $3a1$ and $3b1$ are equal to each other. However, the teeth $2a1$, $2b1$, $3a1$ and $3b1$ of the magnetic poles $2a$, $2b$, $3a$ and $3b$ are shifted, in turn, from one another by length of ¼ pitch.

In a secondary body 16, teeth $16a$ are formed at regular pitches which are equal to the regular pitches of the teeth $2a1$, $2b1$, $3a1$ and $3b1$ of the primary body 1. The secondary body 16 is made of magnetic material. The wheels 12 to 15 ride on non-magnetic band plates $17a$ and $17b$ which are fixed on the side end portions of the secondary body 16, and they are guided by non-magnetic guide band plate 18a and 18b which are fixed to the band plates 17a and 17b along the latter. An air gap g is formed between the teeth 2a1, 2b1, 3a1 and 3b1 of the primary body 1, and the teeth 16a of the secondary body 16.

The secondary body 16 is fixed to, although not shown, a stationary body. The primary body is movable.

For example, when the coils 9a to 9d are energized by one-phase energization method, they are, in turn, energized. It is now assumed that the teeth 3b1 of the magnetic-pole 3b face directly to the teeth 16a of the secondary body 16. Then, a constant DC current is supplied to the coil 9a for a predetermined time. Induced magnetic flux flows through the loop consisting of the magnetic pole 2a, the gap g, the secondary body 16, the gap g, the magnetic pole 2b and the york portion between the magnetic poles 2a and 2b. Magnetic flux from the permanent magnets 6 and 7 is added to the induced magnetic flux in the magnetic pole 2a, while it is cancelled with the induced magnetic flux in the magnetic pole 2b. Magnetic attraction occurs between the teeth 2a1 of the magnetic pole 2a and the teeth 16a of the secondary body 16. The primary body 1 moves forwards by ¼ pitch so that the teeth 2a1 of the magnetic pole 2a come to face directly to the teeth 16a of the secondary body 16, respectively. Next, the constant DC current is supplied to the coil 9b for the predetermined time. Induced magnetic flux flows through the loop consisting of the magnetic pole 2b, the gap g, the secondary body 16, the gap g, the magnetic pole 2a and the york portion between the magnetic poles 2a and 2b. Magnetic flux from the permanent magnets 6 and 7 is added to the induced magnetic flux in the magnetic pole 2b, while it is cancelled with the induced magnetic flux in the magnetic pole 2a. Magnetic attraction occurs between the teeth 2b1 of the magnetic pole 2b and the teeth 16a of the secondary body 16. The primary body 1 moves forwards by ¼ pitch so that the teeth 2b1 of the magnetic pole 2b come to face directly to the teeth 16a of the secondary body 16, respectively.

Similarly, the coils 9c and 9d are, in turn, energized. Thus, the primary body 1 moves forwards step by step in ¼ pitch. Actually, it looks to move continuously forwards.

The above-described linear pulse motor has considerably large length L, height H and width W. A small-sized and thin linear pulse motor is desirable in terminal equipment for office automation applications, for example, in floppy disc drive mechanism. Necessary propelling force to the secondary body or movable body, and stroke are normally small for such applications, and, for example, they are 10 to 100 grams, and 10 to 30 mm. The construction of the prior art linear pulse motor is unsuitable for such applications.

According to this invention, a linear pulse motor can be small-sized and thin, and it is suitable for the above described applications.

Next, a linear pulse motor according to a first embodiment of this invention will be described with reference to FIG. 3 to FIG. 5.

Figure 3:
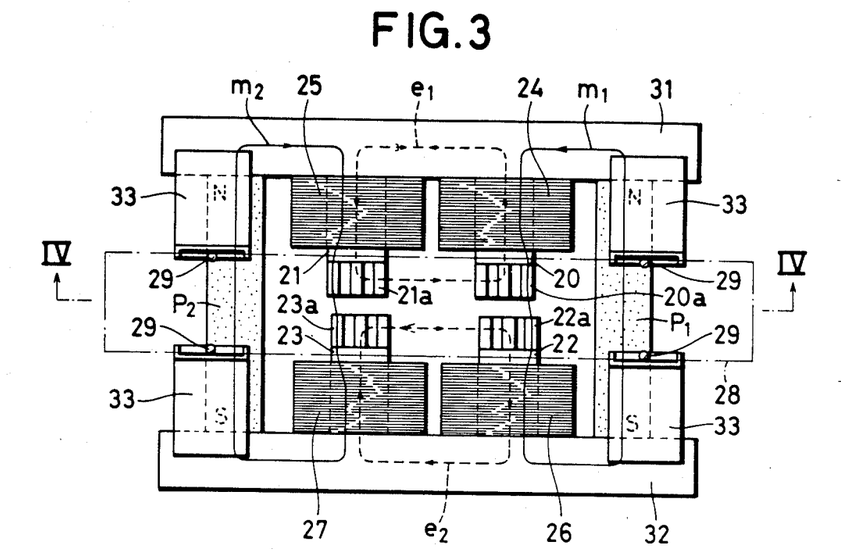
FIG. 3 is a plan view of a linear pulse motor according to a first embodiment of this invention, in which a secondary body is omitted, and shown by a phantom line.
Figure 4:
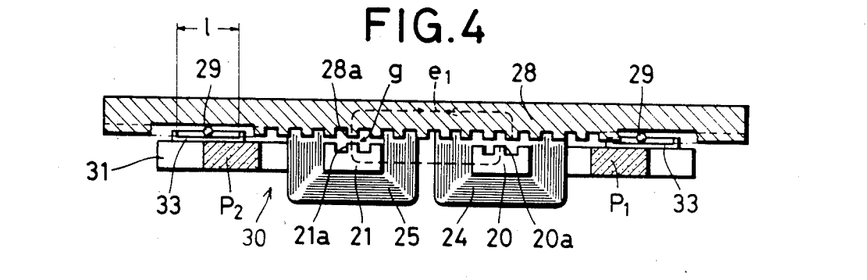
FIG. 4 is a cross-sectional view taken along the line IV—IV in FIG. 3.
Figure 5:
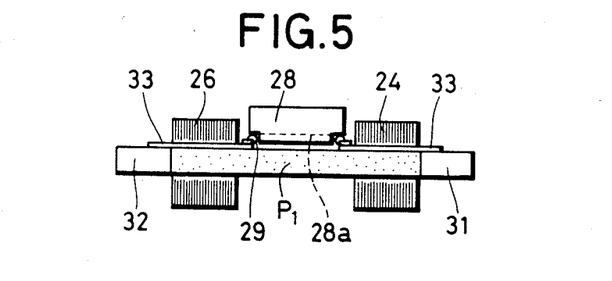
FIG. 5 is a front view of the linear pulse motor of FIG. 3.

Referring to FIG. 3 to FIG. 5, a primary body 30 includes two iron core 31 and 32 facing to each other. Both end portions of the one iron core 31 are connected through two permanent magnets P1 and P2 with both end portions of the other iron core 32. The permanent magnets P1 and P2 are polarized in the same directions, as shown in FIG. 3. A pair of magnetic poles 20 and 21 extend laterally towards the other iron core 32 from the inner side surface of the one iron core 31. Another pair of magnetic poles 22 and 23 extend laterally towards the one iron core 31 from the inner side surface of the other iron core 32. The magnetic poles 20 and 21 of the one iron core 31 face to the magnetic poles 22 and 23 of the other iron core 32, shifting slightly from each other, as shown in FIG. 3. Coils 24 to 27 are fitted to the magnetic poles 20 to 23, respectively. Three teeth 20a, 21a, 22a and 23a are formed in the upper surfaces of top end portions of the magnetic poles 20 to 23, respectively. The teeth 20a to 23a extend along the magnetic poles 20 to 23. The pitches of the teeth 20a to 23a are equal to one another. However, the teeth 20a to 23a are shifted from one another by ¼ pitch in order of 20a, 22a, 21a and 23a.

A secondary body 28 is arranged between the two iron cores 31 and 32, as shown in FIG. 5. Teeth 28a are formed in the lower surfaces of the secondary body 28, in parallel with the teeth 20a to 23a of the primary body 30, and they face to the latter. The pitch of the teeth 28a is equal to the pitch of the teeth 20a to 23a.

The secondary body 18 is guided and borne by balls 29 which are arranged respectively in four guide members 33. The guide member 33 are of non-magnetic material, and fixed to the end portions of the iron cores 31 and 32. As shown in FIG. 4, the teeth 28a of the secondary body 28 are spaced by the air gap g from the teeth 20a to 23a of the magnetic poles 20 to 23 of the primary body 17. The movement length or stroke of the secondary body 28 is determined by the rolling length l (FIG. 4) of the ball 29, and it is within the double of the range of the rolling length l. The primary body 30 is fixed to, although not shown, a stationary body.

Next, there will be described operations of the above-described linear pulse motor.

It is now assumed that the teeth 23a of the magnetic pole 23 of the iron core 32 face directly to the teeth 28a of the secondary body 28. A constant DC current is supplied to the coil 25 for a predetermined time. Induced magnetic flux flows through the magnetic path e1 consisting of the magnetic pole 21, the teeth 21a, the air gap g, the teeth 28a, the secondary body 28, the air gap g, the teeth 20a, the magnetic pole 20 and the yoke portion of the iron core 31, in the direction shown by the solid arrow. Magnetic flux from the one permanent magnet P2 flows through the magnetic path m2 consisting of the one end portion of the iron core 31, the magnetic pole 21, the teeth 21a, the air gap g, the teeth 28a, the secondary body 28, the teeth 28a, the air gap g, the teeth 23a, the magnetic pole 23, the end portion of the iron core 32 and the permanent magnetic P2, in the direction shown by the arrow. Magnetic flux from the other permanent magnet P1 flows through the magnetic path m1 consisting of the other end portion of the iron core 31, the magnetic pole 20, the teeth 20a, the an gap g, the teeth 28a, the secondary body 28, the teeth 28a, the air gap g, the teeth 22a, the magnetic pole 22, the other end portion of the iron core 32 and the permanent magnet P1, in the direction shown by the arrow.

Accordingly, the induced magnetic flux and the magnetic flux from the permanent magnet P2 are added to each other in the air gap g between the teeth 21a of the magnetic pole 21 and the teeth 28a of the secondary body 28, while the induced magnetic flux is cancelled with the magnetic flux from the permanent magnet P1, in the air gap g between the teeth 20a of the magnetic pole 20 and the teeth 28a of the secondary body 28. A magnetic attraction occurs between the teeth 21a of the magnetic pole 21 and the teeth 28a of the secondary body 28. The secondary body 28 is moved leftwards by length of ¼ pitch so that the teeth 28a of the secondary body 28 come to face directly to the teeth 21a of the magnetic pole 21, as shown in FIG. 4.

At the same time when the coil 25 is deenergized, the coil 26 is energized. The constant DC current is supplied to the coil 26 for the predetermined time. Induced magnetic flux flows through the magnetic path e2 consisting of the magnetic pole 22, the yoke portion of the iron core 32, the magnetic pole 23, the teeth 23a, the air gap g, the teeth 28a of the secondary body 28, the air gap g, the teeth 22a of the magnetic pole 22 in the direction shown by the solid arrow. Magnetic flux from the other permanent magnet P1 flows through the magnetic path m1 consisting of the other end portion of the iron core 31, the magnetic pole 20, the teeth 20a, the air gap g, the teeth 28a of the secondary body 18, the air gap g, the teeth 22a, the magnetic pole 22, the other end portion of the iron core 32 and the permanent magnet P1, in the direction shown by the arrow. Magnetic flux from the one permanent magnet P2 flows through the magnetic path m2 consisting of the one end portion of the iron core 31, the magnetic pole 21, the teeth 21a, the air gap g, the teeth 28a of the secondary body 28, the air gap g, the teeth 23a, the magnetic pole 23, the one end portion of the iron core 32 and the permanent magnet P2, in the direction shown by the arrow.

Accordingly, the induced magnetic flux and the magnetic flux from the permanent magnet P1 are added to each other in the air gap g between the teeth 22a of the magnetic pole 22 and the teeth 28a of the secondary body 28, while the induced magnetic flux is cancelled with the magnetic flux for the permanent magnet P2 in the air gap g between the teeth 23a of the magnetic pole 23 and the teeth 28a of the secondary body 28. A magnetic attraction occurs between the teeth 22a of the magnetic pole 22 and the teeth 28a of the secondary body 28. The secondary body 28 is moved leftwards by length of ¼ pitch so that the teeth 28a of the secondary body 28 come to face directly to the teeth 22a of the magnetic pole 22.

At the same time when the coil 26 is deenergized, the coil 24 is energized. The constant DC current is supplied to the coil 24 for the predetermined time. Induced magnetic flux flows through the magnetic path e1 consisting of the magnetic pole 20, the yoke portion of the iron core 31, the magnetic pole 21, the teeth 21a, the air gap g, the teeth 28a of the secondary body 28, the air gap g, the teeth 20a of the magnetic pole 20 in the direction shown by the dotted solid arrow.

Accordingly, the induced magnetic flux and the magnetic flux from the permanent magnet P1 are added to each other in the air gap g between the teeth 20a of the magnetic pole 20 and the teeth 28a of the secondary body 28, while the induced magnetic flux is cancelled with the magnetic flux from the permanent magnet P2 in the air gap g between the teeth 21a the magnetic pole 21 and the teeth 28a of the secondary body 28. A magnetic attraction occurs between the teeth 20a of the magnetic pole 20 and the teeth 28a of the secondary body 28a. The secondary body 28 is moved leftwards by length of ¼ pitch so that the teeth 28a of the secondary body 28 come to face directly to the teeth 20a of the magnetic pole 20.

At the same time when the coil 24 is deenergized, the coil 27 is energized. The constant DC current is supplied to the coil 27 for the predetermined time. Induced magnetic flux flows through the magnetic path e2 consisting of the magnetic pole 23, the yoke portion of the iron core 32, the magnetic pole 22, the teeth 22a, the air gap g, the teeth 28a of the secondary body 28, the air gap g, the teeth 23a of the magnetic pole 23 in the direction shown by the dotted arrow.

Accordingly, the induced magnetic flux and the magnetic flux from the permanent magnet P2 are added to each other in the air gap g between the teeth 23a of the magnetic pole 23 and the teeth 28a of the secondary body 28, while the induced magnetic flux is cancelled with the magnetic flux from the permanent magnet P1 in the air gap g between the teeth 22a of the magnetic pole 22 and the teeth 28a of the secondary body 28. A magnetic attraction occurs between the teeth 23a of the magnetic pole 23 and the teeth 28a of the secondary body 28. The secondary-body 28 is moved leftwards by length of ¼ pitch so that the teeth 28a of the secondary body 28 come to face directly to the teeth 28a of the magnetic pole 23. Thus, the coils 25, 26, 24 and 27 are energized successively in order. The secondary body 28 is moved leftwards step by step in ¼ pitch. Actually, it looks to move continuously.

As above described, in this embodiment, the magnetic flux flowing through the magnetic poles 20 to 23 is substantially vertical to the magnetic flux flowing through the air gap g from the teeth 20a to 23a of the magnetic poles 20 to 23 to the teeth 28a of the secondary body 28, and from the teeth 28a of the secondary body 28 to the teeth 20a to 23a of the magnetic poles 20 to 23, in contrast to the prior art linear pulse motor of the embodiment. The height of the linear pulse motor of this embodiment can be mainly determined by the thickness of the magnetic pole, the number of turns of the coil, and the air gap g. The thickness of the magnetic pole and the number of turns of the coil can be reduced with the decrease of the necessary propelling force to the secondary body. Further, the teeth of the magnetic pole extend in parallel with the magnetic flux flowing the magnetic pole. Accordingly, the teeth of the magnetic poles 20 to 23 can be arranged in the concentrical manner as shown in FIG. 3. Laterally projecting wheels are not used. As the result, the height, length and width of the linear pulse motor of this embodiment are smaller than those of the prior art linear pulse motor.

Next, a linear pulse motor according to a second embodiment of this invention will be described with reference to FIG. 6 to FIG. 8.

Figure 6:
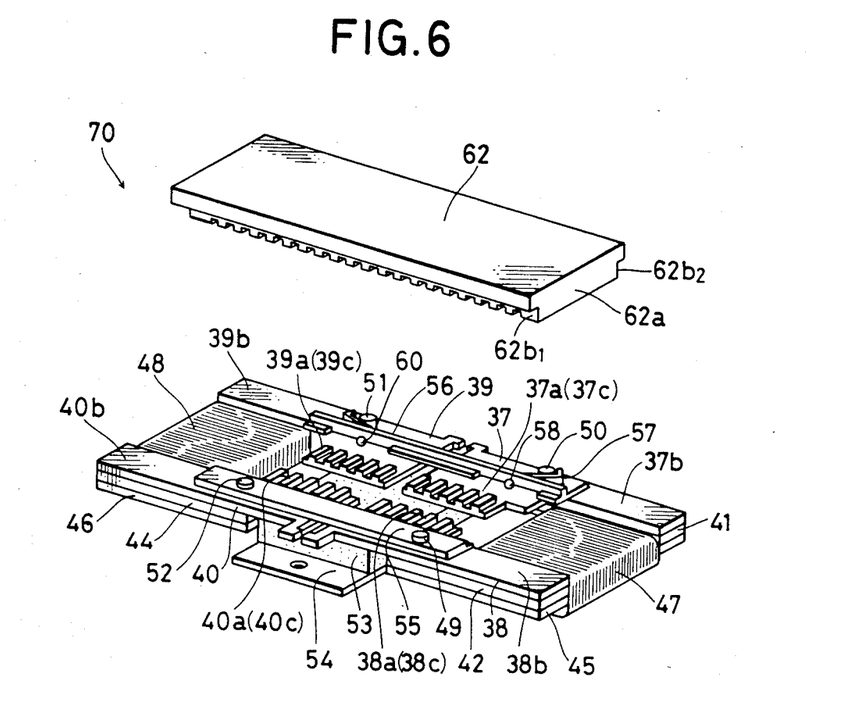
FIG. 6 is a perspective view of a linear pulse motor according to a second embodiment of this invention, in which a secondary body is separated away from a primary body.
Figure 7:
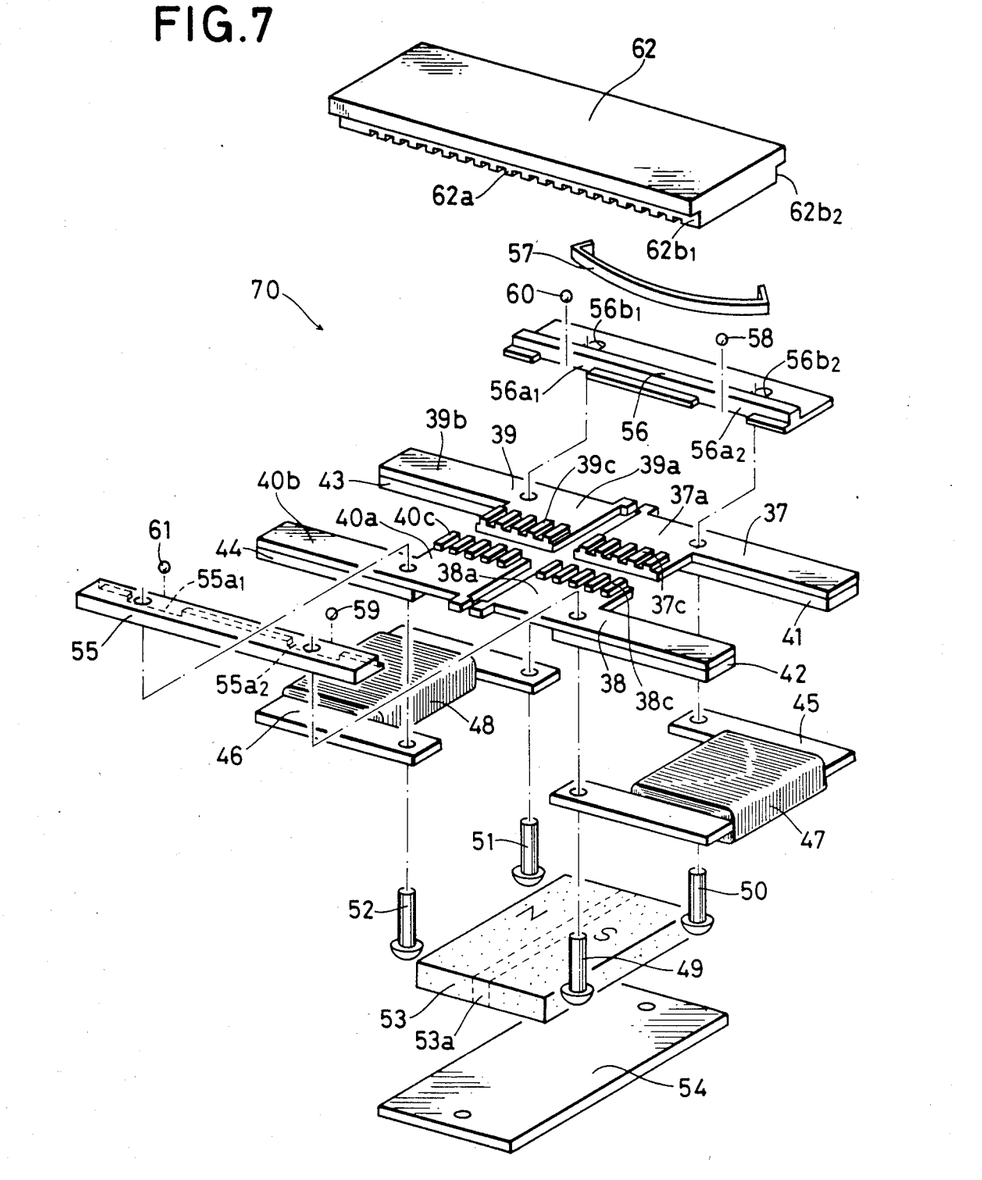
FIG. 7 is an exploded perspective view of the linear pulse motor of a FIG. 6.
Figure 8:
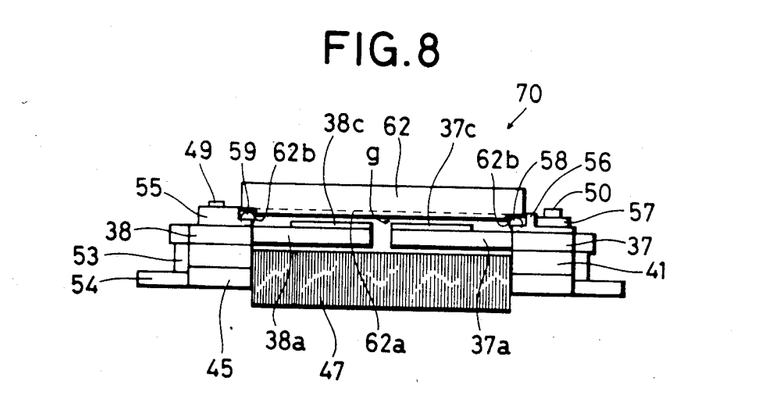
FIG. 8 is a front view of the linear pulse motor of FIG. 6, in which the primary body and the secondary body are assembled with each other.

Referring to FIG. 6 and FIG. 7, four L-shaped magnetic pole members 37 to 40 are so arranged as to form generally a letter H. Head portions 37a to 40a of the magnetic pole members 37 to 40 are concentrated. Five upstanding teeth or ridges 37c to 40c are formed in the end portions of the head portions 37a to 40a, respectively, in parallel with one another. The pitches of the teeth 37c to 40c are equal to one another. However, the teeth 37c to 40c are shifted from one another by ¼ pitch in order of 39c, 38c, 40c and 37c.

Spacers 41 to 44 of magnetic material are attached to the lower surface of leg portions 37b to 40b of the magnetic pole members 37 to 40. Generally U-shaped magnetic core frames 45 and 46 are fixed through the spacers 41 to 44 to the leg portions 37b and 38b, and 39b and 40b of the magnetic pole members 37 to 40 by revets 49 and 50, and 51 and 52, respectively. Coils 47 and 48 are fitted to the central portions of the magnetic core frames 45 and 46, respectively.

A permanent magnet 53 is so arranged under the head portions 37a to 40a that its N-polarized portion N contacts with the lower surfaces of the head portions 39a and 40a of the magnetic pole members 39 and 40, and that its S-polarized portions S contacts with the lower surfaces of the head portion 37a and 38a. A non-polarized portion 53a is formed between the N-polarized portion N and the S-polarized portions S. A fixing plate 54 of magnetic material is arranged under the permanent magnet 53. It constitutes a part of a magnetic circuit. A primary body 70 consisting of the magnetic pole members 37 to 40, the magnetic core frames 45 and 46, the permanent magnet 53, the coils 47 and 48, etc., is fixed through the fixing plate 54 to a not-shown stationary body.

Guide members 55 and 56 are provided with a pair of ball guide portions 55a1, and 55a2, and a pair of ball guide portions 56a, and 56a2, respectively. The one guide member 55 is fixed to the outer end portion of the head portions 38a and 40a of the magnetic pole members 38 and 40 by the rivets 49 and 52. A pair of oblong openings 56b1 and 56b2 are formed in the other guide member 56. The rivets 51 and 50 freely pass through the oblong openings 56b1 and 56b2. Accordingly, the other guide member 56 is displaceable in the direction perpendicular to the movement direction of a secondary body 62, within the range of the oblong openings 56b1 and 56b2. A leaf spring 57 is supported at both ends by the rivets 50 and 51 and it urges the other guide member 56 towards the teeth 37c and 39c of the head portions 37a and 39a. Balls 58 to 61 are arranged in the ball guide portions 56a2, 55a2, 56a1 and 55a1.

The secondary body 62 is plate-like. Teeth or ridges 62a are formed at the same pitch of the teeth 37c to 40c of the primary body 70 in the lower surface of the secondary body 62. Further, cut-outs 62b1 and 62b2 having L-shaped cross-section are formed in both sides of the secondary body 62, and they contact with the balls 59 to 61. Thus, a predetermined air gap g is obtained between the teeth 62a of the secondary body 62 and the teeth 37c to 40c of the magnetic pole members 37 to 40. The balls 58 to 61 are softly pinched between the ball guide portions 35a1, 35a2, 36a1, 36a2 and the cutouts 42b1, 42b2 by spring action of the leaf spring 57. The balls 58 to 61 are rollable within the ranges of the ball guide portions 35a1, 35a2, 36a, and 36a2, and guide the secondary body 62.

Next, there will be described operations of the above-described linear pulse motor.

The head portions 39a and 40a of the magnetic pole members 39 and 40 are N-polarized by the permanent magnet 53, while the head portion 37a and 38a of the magnetic pole members 37 and 38 are S-polarized by the permanent magnet 53.

It is now assumed for facilitating the understanding that the teeth 37c of the head portion 37a is directly facing to the teeth 62a of the secondary body 62. A positive DC current +I is supplied to the coil 48 for a predetermined time. Induced magnetic flux and magnetic flux from the permanent magnet 53 are added to each other in the teeth 39c of the head portion 39a, and the air gap g between the teeth 62a of the secondary body 62 and the teeth 39c of the head portion 39a, while the induced magnetic flux is cancelled with the magnetic flux from the permanent magnet 53 in the teeth 40c of the head portion 40a, and the air gap g between the teeth 62a of the secondary body 62 and the teeth 40c of the head portion 40a. Magnetic attraction occurs between the teeth 62a of the secondary body 62 and the teeth 39c of the head portion 39a. The secondary body 62 steps forwards by ¼ pitch so that the teeth 62a of the secondary body 62 comes to face directly to the teeth 39c of the head portion 39a.

At the same time when the coil 48 is deenergized, the coil 47 is energized. The positive DC current +I is supplied to the coil 47 for the predetermined time. Induced magnetic flux and magnetic flux from the permanent magnet 53 are added to each other in the teeth 38c of the head portion 38a, and the air gap g between the teeth 62a of the secondary body 62 and the teeth 38c of the head portion 38a, while the induced magnetic flux is cancelled with the magnetic flux from the permanent magnet 53 in the teeth 37c of the head portion 37a, and the air gap g between the teeth 62a of the secondary body 62 and the teeth 37c of the head portion 37a. Magnetic attraction occurs between the teeth 62a of the secondary body 62 and the teeth 38c of the head portion 38a. The secondary body 62 steps forwards by ¼ pitch so that the teeth 62a of the secondary body 62 comes to face directly to the teeth 38c of the head portion 38a.

At the same time when the coil 47 is deenergized, the coil 48 is energized. A negative DC current −I is supplied to the coil 48 for the predetermined time. Induced magnetic flux and magnetic flux from the permanent magnet 53 are added to each other in the 40c of the head portion 40a, and the air gap g between the teeth 62a of the secondary body 62 and the teeth 40c of the head portion 40a, while the induced magnetic flux is cancelled with the magnetic flux from the permanent magnet 53 in the teeth 39c of the head portion 39a, and the air gap between the teeth 62a of the secondary body 62 and the teeth 39c of the head portion 39a. Magnetic attraction occurs between the teeth 62a of the secondary body 62 and the teeth 40c of the head portion 40a. The secondary body 62 steps forwards by ¼ pitch so that the teeth 62a of the secondary body 62 comes to face directly to the teeth 40c of the head portion 40a.

At the same time when the coil 48 is deenergized, the coil 47 is energized. The negative DC current −I is supplied to the coil 47 for the predetermined time. Induced magnetic flux and magnetic flux from the permanent magnet 53 are added to each other in the teeth 37c of the head portion 37a, and the air gap g between the teeth 62a of the secondary body 62 and the teeth 37c of the head portion 37a, while the induced magnetic flux is cancelled with the magnetic flux from the permanent magnet 53 in the teeth 38c of the head portion 38a, and the air gap g between the teeth 62a of the secondary body 62 and the teeth 38c of the head portion 38a. Magnetic attraction occurs between the teeth 62a of the secondary body 62 and the teeth 37c of the head portion 37a. The secondary body 62 step forwards by ¼ pitch so that the teeth 62a of the secondary body 62 comes to face directly to the teeth 37c of the head portion 37a.

Thus, the secondary body 62 is displaced by one pitch. After that time, the coils 46 and 47 are alternately energized in the above described manner. Although the secondary body 62 is moved step by step, it looks to move continuously. The permissible largest stroke of the secondary body 62 is determined by the permissible rolling range of the balls 58 to 61, and it is equal to the double of the length of the ball guide portions 55a1, 55a2, 56a1, 56a2. The secondary body 62 is moved backwards by reversing the above described energization order of the coils 47 and 48.

Also the linear pulse motor of the second embodiment can be small-sized in height, length and width in comparison with the prior art linear pulse motor.

Figure 9:
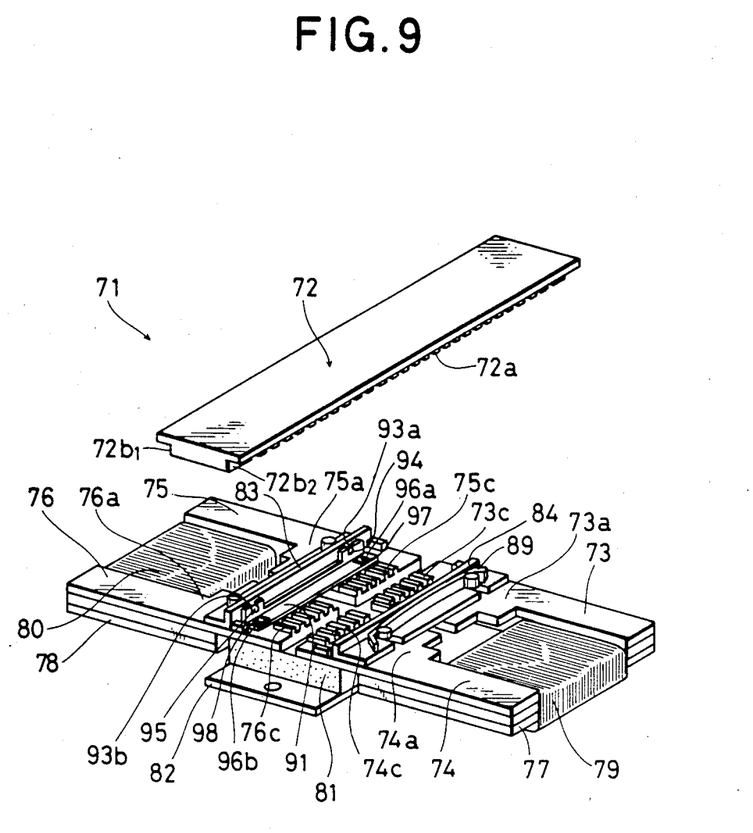
FIG. 9 is a perspective view of a linear pulse motor according to a third embodiment of this invention, in which a secondary body is separated away from a primary body.
Figure 10:
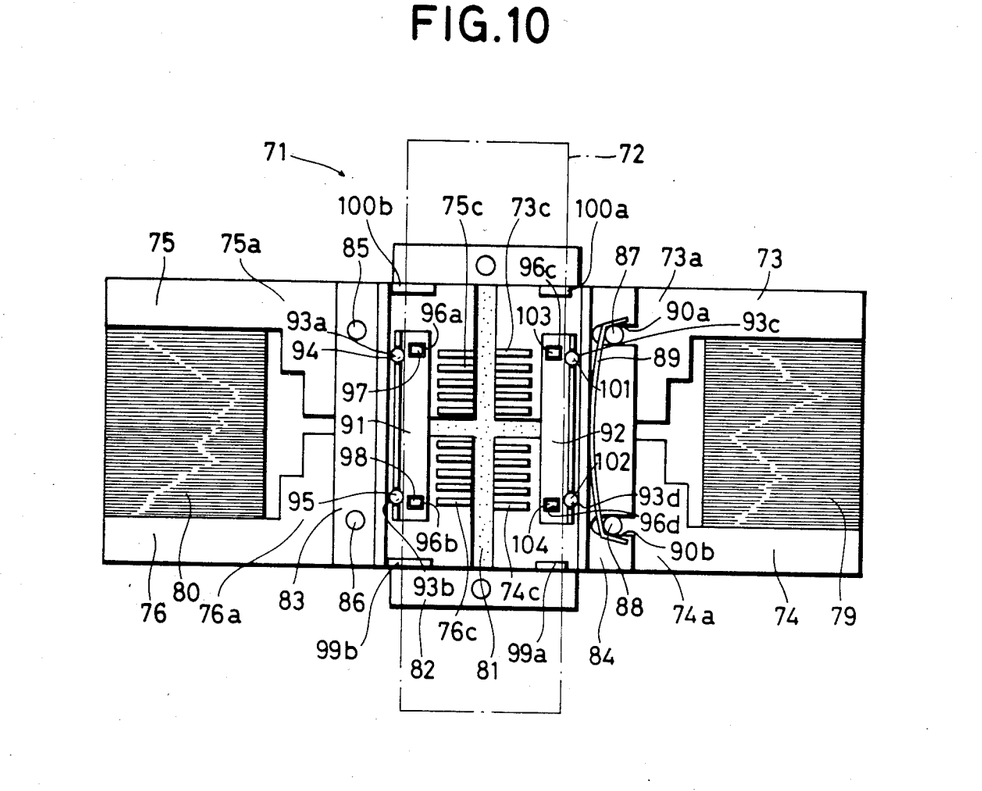
FIG. 10 is a plan view of the linear pulse motor of FIG. 9, in which the secondary body is shown by the phantom line.
Figure 11:
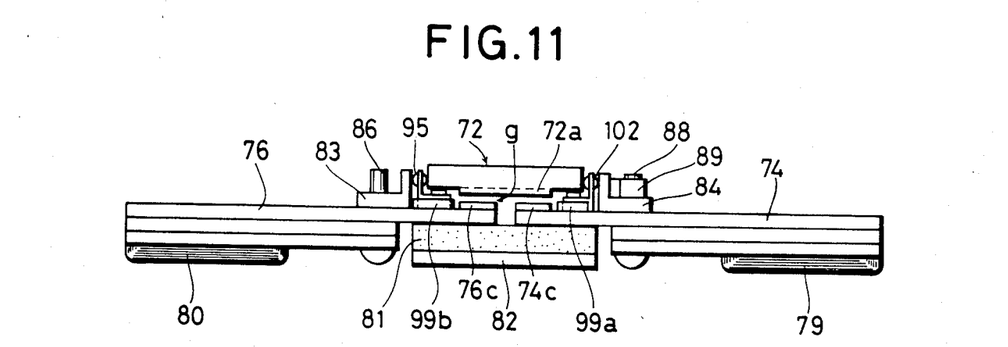
FIG. 11 is a front view of the linear pulse motor, in which the primary body and the secondary body are assembled with each other.

Next, a linear pulse motor according to a third embodiment of this invention will be described with reference to FIG. 9 to FIG. 11.

In this embodiment, a plate-like secondary body 72 is moved in a direction perpendicular to the lengthwise direction of a primary body 71, in comparison with the linear pulse motor of the second embodiment.

Similarly to the secondary body 62 of the second embodiment, teeth or ridges 72a are formed at the constant pitch in the lower surface of the secondary body 72, and cutouts 72b1 and 72b2 having L-shaped cross-section are formed at both sides.

Four L-shaped magnetic pole members 73 to 76 are so arranged as to form generally a letter H. In the same manner as the second embodiment, head portions 73a to 76a of the magnetic pole members 73 to 76 are concentrated. However, upstanding teeth or ridges 73c top 76c formed in the end portions of the head portions 73a to 76a extend in the lengthwide direction of the magnetic pole members 73 to 76, in contrast to the teeth or ridges of the head portions 37a to 40a of the second embodiment. U-shaped magnetic core frames 77 and 78 are attached to the lower surfaces of the magnetic pole members 73 to 76. Coils 79 and 80 are fitted to the central portions of the magnetic core frames 77 and 78, respectively.

A permanent magnet 81 polarized in the same manner as the permanent magnet 53 of the second embodiment is attached to the lower surfaces of the head portions 73a to 76a. The head portions 75a and 76a of the magnetic pole members 75 and 76 are N-polarized by the permanent magnet 81, while the head portions 73a and 74a of the magnetic pole members 73 and 74 are S-polarized by the permanent magnet 81.

The pitches of the teeth 73c to 76c are equal to one another, and equal to the teeth 72a of the secondary body 72. However, the teeth 73c to 76c are shifted from one another by ¼ pitch in order of 75c, 77c, 76c and 73c.

A fixing plate 82 of magnetic material is arranged under the permanent magnet 81. It constitutes a part of a magnetic circuit. A primary body 71 consisting of the magnetic pole members 73 to 76, the magnetic core frames 77 and 78, the permanent magnet 81, the coils 79 and 80, etc., is fixed through the fixing plate 82 to a not-shown stationary body.

Support members 83 and 84 having L-shaped cross-section, of non-magnetic material, are arranged at both sides of the teeth 73c to 76c. The one support member 83 is fixed to the head portions 75a and 76a by rivets 85 and 86. A pair of oblong cutouts 90a and 90b are formed in the other support member 84. Rivets 87 and 88 fixing the magnetic core frame 77 to the magnetic pole members 73 and 74 are freely engaged with the cutouts 90a and 90b. A leaf spring 89 is fitted at both ends to the rivets 87 and 88, and it urges the other support member 84 towards the one support member 83. A pair of guide members 91 and 92 having L-shaped cross-section, of non-magnetic material are arranged back to back with the support members 83 and 84. Pairs of cutouts 93a and 93b, 93c and 93d are formed in the vertical portions of the guide members 91 and 92, respectively. Balls 94 and 95 are rollably fitted into the cutouts 93a and 93b of the guide member 91. Similarly, balls 101 and 102 are rollably fitted into the cutouts 93c and 93d. Further pairs of cutouts 96a and 96b, 96c and 96d are formed in the horizontal portions of the guide members 91 and 92, respectively. Rollers 97 and 98, 103 and 104 are rollably fitted into the cutouts 96a and 96b, 96c and 96d, respectively.

Stoppers 99a, 99b, 100a and 100b are fixed on the outer ends of the head portions 73a to 76a between the support members 83 and 84. The movement of the guide members 91 and 92 is limited by the stoppers 99a, 99b, 100a and 100b. The secondary body 72 is guided at both sides by the balls 94, 95, 101 and 102. The cutouts 72b, and 72b2 of the secondary body 72 ride on the rolls 97, 98, 103 and 104. The air gap g between the teeth 72a of the secondary body 72 and the teeth 73c to 76c of the head portions 73a to 76a of the primary body 71 is obtained by the rolls 97, 98, 103 and 104. The range of the movement of the secondary body 72 is determined by the range of the movement of the guide members 91 and 92, and the former is equal to the double of the latter.

The coils 79 and 80 are alternately energized in the same manner as the coils 46 and 47 of the second embodiment. Magnetic attraction occurs between the teeth 73c to 76c of the primary body 71 and the teeth 72a of the secondary body 72 in the order of the teeth 75c, 77c, 76c and 73a. The secondary body 72 is moved forwards step by step guided by the balls 94, 95 101, 102 of the guide members 91 and 92 in the direction perpendicular to the leg portions of the magnetic pole members 73 to 76.

In the above described embodiments of FIG. 3 to FIG. 11, the primary body is fixed to the not-shown stationary body, and the secondary body is movable. However, when the secondary body is fixed to a not-shown stationary body, the primary body is movable. For example, a head in a printer or an optical reading apparatus is fixed to the secondary body, and it is accurately positioned by controlling the energizations of the coils.

The above embodiments have further the following advantages:

(1) The magnetic pole surfaces are concentrated to one another in contrast to the prior art linear pulse motor. Accordingly, magnetic path length can be shorter, and magnetic flux efficiency can be improved.

(2) On the ground of the above paragraph (1), the secondary body can be small-sized. When the secondary body is movable, the ratio of the propelling force to the weight of the movable body can be increased. Accordingly, the response can be improved.

(3) Magnetic path lengths of magnetic fluxes from permanent magnet can be uniform. Accordingly, propelling forces can be substantially uniform, and the positioning accuracy can be improved.

(4) The whole of the linear pulse motor can be thin. Accordingly, its application fields can be widened.

While the preferred embodiments have been described, variations thereto will occur to those skilled in the art within the scope of the present inventive concepts which are delineated by the following claims.

For example, in the first embodiments, the coils 24 to 27 are fitted respectively to the magnetic poles 20 to 23. Instead, coils may be fitted respectively to the yoke portions. The two coils are alternately energized in positive and negative polarities. Thus, the number of the coils is reduced to the half.

Further, in the first embodiment, the permanent magnets P1 and P2 are arranged between the opposite ends of the extensions of the yoke portions. Instead, one permanent magnet may be combined between the centers of the yoke portions. In that case, the magnetic poles 20 and 21, and 22 and 23 are further separated from each other so as to arrange the one permanent magnet between the coils 24 and 25, and 26 and 27.

Further in the first embodiment, the coils 24 to 27 are energized one by one. Instead, they may be energized selectively two by two. Such an operation is so-called "two-phase energization method."

Further in the first embodiment, the permanent magnets may be omitted. In that case, magnetic attraction for driving the secondary body occurs between the teeth of the primary body in the magnetic circuit having the lowest magnetic resistance, and the teeth of the secondary body.

Such a linear pulse motor is so called "reluctance-type linear pulse motor".

Further, in the first embodiment, the one magnetic core 31 and accordingly the coils 24 and 25 may be omitted. Also in the case, only one coil may be fitted to the center of the york portion of the core 32 instead of the two coils 27 and 27.

In the second and third embodiments, the teeth of the primary body are formed as ridges in the head portions of the magnetic pole members. However, they may be formed as slits in the head portions of the magnetic pole members. In that case, the pair of the magnetic members may be combined as one body. Although leakage of magnetic flux is increased, and efficiency is lowered, the mechanical strength is increased.

Further in the second and third embodiments, the two coils are alternately energized one by one. However, they may be energized at the same time. Further, the support members 83, 84 and guide members 91 and 92 in the third embodiment may be used in the second embodiment, instead of the guide members 55 and 56. Or the guide members 55 and 56 in the second embodiment may be used in the third embodiment, instead of the support members 83 and 84 and guide members 91 and 92.

What is claimed is:

1. A linear pulse motor comprising:
   (A) a primary body including first magnetic circuit forming means provided with a coil or coils;
   (B) a secondary body including second magnetic circuit forming means, one of said primary body and said secondary body being movable relative to the other in one axis of direction;
   (C) said primary body and said secondary body being flat in parallel planes to each other;
   (D) said first magnetic circuit forming means including plural pole surface portions in one surface in each of which first plural teeth are formed at constant pitch, the groups of the first plural teeth of said plural pole surface portions being shifted from one another in a predetermined order by the pitch length x the reciprocal of the number of said pole surface portions (p/n, where p and n represent the pitch length of the first plural teeth and the number of said pole surface portions, respectively);
   (E) said second magnetic circuit forming means including second plural teeth of the same pitch as said first plural teeth of the plural pole surface portions; and
   (F) guide means for guiding said one of the primary body and the secondary body movably in said one axis of direction, arranged between said primary body and said secondary body for maintaining the constant air gap between said first plural teeth and second plural teeth;
   (G) the axis of said coil or coils around which said coil or coils are wound, being substantially perpendicular to said constant air gap;
   wherein at least one closed magnetic circuit is formed by said first and second magnetic circuit forming means, and said air gap, when said coil or coils are energized in such a mode or order that magnetic attraction occurs between the selected one or ones of the groups of said first plural teeth in said predetermined order, and said second plural teeth of the secondary body for moving said one of the primary body and secondary body by P/n in said one direction, magnetic flux flows through said one closed magnetic circuit and is substantially perpendicular to said air gap in said first magnetic circuit forming means.

2. A linear pulse motor according to claim 1, in which said first magnetic circuit forming means includes a pair of magnetic cores, each of which includes a yoke portion and plural magnetic pole portions projected laterally from said yoke portion, said magnetic pole portions of the one magnetic core extending towards said magnetic pole portions of the other magnetic core, respectively, and said pole surfaces being formed in the end portions of said magnetic pole portions, and said coils are fitted to said magnetic pole portions of the magnetic cores, respectively.

3. A linear pulse motor according to claim 2, in which opposite extensions of said yoke portions are combined with each other through permanent magnets, and the magnetization directions of said permanent magnets are equal to each other.

4. A linear pulse motor according to claim 2, in which said guide means includes pairs of guide members fixed to the stationary one of said primary body and said secondary body, and balls which are arranged in guide portions of said guide members, respectively, said secondary body is plate-like, and cutout portions formed along the lengthwise sides of said secondary body ride on said balls.

5. A linear pulse motor according to claim 4, in which the rolling range of said balls are limited to a certain extent in the moving direction of said one of the primary body and the secondary body.

6. A linear pulse motor according to claim 3, in which said guide means includes pairs of guide members fixed to the stationary one of said primary body and said secondary body, and balls which are arranged in guide portions of said guide means, respectively, said secondary body is plate-like, and cutout portions formed along the lengthwise sides of said secondary body ride on said balls.

7. A linear pulse motor according to claim 6, in which the rolling range of said balls are limited to a certain extent in the moving direction of said one of the primary body and the secondary body.

8. A linear pulse motor according to claim 2 in which the central portions of said yoke portions are combined with each other through a permanent magnet.

9. A linear pulse motor according to claim 1, in which said first magnetic circuit forming means includes a pair of magnetic cores, each of which includes a yoke portion and two magnetic pole portions projected laterally from said yoke portion, said magnetic pole portions of the one magnetic core extending towards said magnetic pole portions of the other magnetic core, respectively, and said pole surfaces being formed in the end portions of said magnetic pole portions, and said coils are fitted to said magnetic pole portions of the magnetic cores, respectively.

10. A linear pulse motor according to claim 9, in which opposite extensions of said yoke portions are combined with each other through permanent magnets, and the magnetization directions of said permanent magnets are equal to each other.

11. A linear pulse motor according to claim 9, in which said guide means includes pairs of guide members fixed to the stationary one of said primary body and said secondary body, and balls which are arranged in guide portions of said guide means, respectively, said secondary body is plate-like, and cutout portions formed along the lengthwise sides of said secondary body ride on said balls.

12. A linear pulse motor according to claim 11, in which the rolling range of said balls are limited to a certain extent in the moving direction of said one of the primary body and the secondary body.

13. A linear pulse motor according to claim 9 in which the central portions of said yoke portions are combined with each other through a permanent magnet.

14. A linear pulse motor according to claim 1, in which said first magnetic circuit forming means includes a pair of magnetic cores, each of which includes a yoke porion and two magnetic pole portions projected laterally from said yoke portion, said magnetic pole portions of the one magnetic core extending towards said magnetic pole portions of the other magnetic core, respectively, and said pole surfaces being formed in the end portions of said magnetic pole portions, and said coils are fittted to said yoke portions of the magnetic cores, respectively.

15. A linear pulse motor according to claim 14, in which opposite extensions of said yoke portions are combined with each other through permanent magnets, and the magnetization directions of said permanent magnets are equal to each other.

16. A linear pulse motor according to claim 1, in which said first magnetic circuit forming means includes two pairs of generally L-shaped magnetic pole members, and a pair of generally U-shaped magnetic core frame superimposed respectively on said pairs of the magnetic pole members, head portions of said magnetic pole members are so arranged to be concentrated to one another, said first plural teeth are formed in the end portions of said head portions, in a substantially perpendicular direction to the lengthwise direction of the leg portions of said magnetic pole members, respectively, a coil is fitted to the central portion of each of said magnetic core frames, a permanent magnet is so superimposed on said head portions of the magnetic pole members that the head portions of one of said two pairs of the magnetic pole members are N-polarized, and that the head portions of the other of said two paris of the magnetic pole members are S-polarized.

17. A linear pulse motor according to claim 16 in which said guide means includes a pair of guide members arranged on the outer side end portions of said head portions of the magnetic pole members along said leg portions of the magnetic pole members, and balls arranged in guide portions of said guide members, one of said guide members is fixed to said primary body, while the other of said guide members is so supported on said primary body as to be movable towards said one of the guide members, and is urged towards said one of the guide members by a spring, said secondary body is plate-like, and cutout portions formed along the lengthwise sides of said secondary body ride on said balls, said balls being softly pinched between said cutout portions of the secondary body and said guide portions of the guide members.

18. A linear pulse motor according to claim 17, in which the rolling range of said balls are limited to a certain extent in the moving direction of said one of the primary body and the secondary body.

19. A linear pulse motor according to claim 16, in which said coils are energized in such a manner that one of said coils is energized in positive polarity for a predetermined time, at the same time as the deenergization of said one coil, the other of said coils is energized in positive polarity for the predetermined time, at the same time as the deenergization of said other coil, said one coil is energized in negative polarity for the predetermined time, and at the same time as the deenergization of said one coil, said other coil is enrgized in negative polarity for the predetermined time.

20. A linear pulse motor according to claim 19, in which the groups of said first plural teeth of the head portions of the magnetic pole members are shifted one another by a quarter of the pitch in the following order of: one of the head portions of one of said two pairs of the magnetic pole members, one of the head portions of the other of said two pairs, the other of the head portions of said one of the two pairs, and the other of the head portions of said other of the two pairs.

21. A linear pulse motor according to claim 1, in which said first magnetic circuit forming means includes two pairs of generally L-shaped magnetic pole members, and a pair of generally U-shaped magnetic core frames superimposed respectively on said pairs of the magnetic pole members, head portions of said magnetic pole members are so arranged to be concentrated to one another, said first plural teeth are formed in the end portions of said head portions, in a substantially parallel direction to the lengthwise direction of the leg portions of said magnetic pole members, respectively, a coil is fitted to the central portion of each of said magnetic core frames, a permanent magnet is so superimposed on said head portions of the magnetic pole members that the head portions of one of said two paris of the magnetic pole members are N-polarized, and that the head portions of the other of said two paris of the magnetic pole members are S-polarized.

22. A linear pulse motor according to claim 21 in which said guide means includes a pair of guide members arranged at both sides of the group of said head portions of the magnetic pole members in a substantially perpendicular direction to said leg portions of the magnetic pole members, and balls arranged in guide portions of said guide members, one of said guide members is fixed to said primary body, while the other of said guide members is so supported on said primary body as to be movable towards said one of the guide members, and is urged towards said one of the guide members by a spring, said secondary body is plate-like, and cutout portions formed along the lengthwise sides of said secondary body ride on said balls, said balls being softly pinched between said cutout portions of the secondary body and said guide portions of the guide members.

23. A liner pulse motor according to claim 22 in which the rolling range of said balls are limited to a certain extent in the moving direction of said one of the primary body and the secondary body.

24. A linear pulse motor according to claim 21, in which said coils are energized in such a manner that one of said coils is energized in positive polarity for a predetermined time, at the same time as the deenergization of said one coil, the other of said coils is energized in positive polarity of the predetermined time, at the same time as the deenergization of said other coil, said one is energized in negative polarity for the predetermined time, and at the same time as the deenergization of said one coil, said other coil is energized in negative polarity for the predetermined time.

25. A linear pulse motor according to claim 24 in which the groups of said first plural teeth of the head portions of the magnetic pole members are shifted one another by a quarter of the pitch in the following order of: one of the head portions of one of said two pairs of the magnetic pole members, one of the head portions of the other of said two pairs, the other of the head portions of said one the two pairs, and the other of the head portions of said other of the two pairs.

26. A linear pulse motor according to claim 16, in which said guide means includes a pair of support members arranged on the outer side end portions of said head portions of the magnetic pole members along said leg portions of the magnetic pole members, a pair of guide members having generally L-shaped cross-section, arranged slidably along said support members, balls received by a pair of cutouts formed in a vertical portion of each of said guide members, and rolls received by a pair of cutouts formed in a horizontal portion of each of said guide members, one of said support members is fixed to said primary body, while the other of said support members is so supported on said primary body as to be movable towards said one of the support members, and is urged towards said one of the support members by a spring, said secondary body is plate-like, cutout portions formed along the lengthwise sides of said secondary body ride on said rolls, said balls are softly pinched between the lengthwise sides of said secondary body and said support members for guiding the movement of said one of the primary body and secondary body, and said air gap is maintained by said rollers.

27. A linear pulse motor according to claim 26, in which stoppers are fixed to said primary body at such positions that the slide movements of said guide members along said support members are limited to a predetermined length thereby.

28. A linear pulse motor according to claim 21, in which said guide means includes a pair of support members arranged at both sides of the groups of said head portions of the magnetic pole members in a substantially perpendicular direction to said leg portions of the magnetic pole members, a pair of guide members having generally L-shaped cross-section, arranged slidably along said support members, balls received by a pair of cutouts formed in a vertical portion of each of said guide members, and rolls received by a pair of cutouts formed in a horizontal portion of each of said guide members, one of said support members is fixed to said primary body, while the other of said support members is so supported on said primary body as to be movable towards said one of the support members, and is urged towards said one of the support members by a spring, said secondary body is plate-like, cutout portions formed along the lengthwise sides of said secondary body ride on said rolls, said balls are softly pinched between the lengthwise sides of said secondary body and said support members for guiding the movement of said one of the primary body and secondary body, and said air gap is maintained by said rollers.

29. A linear pulse motor according to claim 28, in which stoppers are fixed to said primary body at such positions that the slide movements of said guide members along said support members are limited to a predetermined length thereby.

* * * * *